US009936684B2

(12) United States Patent
Perko (10) Patent No.: US 9,936,684 B2
(45) Date of Patent: Apr. 10, 2018

(54) FURNITURE PIECE WITH INSECT CONTROL BARRIER AND METHOD RELATING THERETO

(71) Applicant: Blockhouse Company, Inc., York, PA (US)

(72) Inventor: Stephen Perko, York, PA (US)

(73) Assignee: Blockhouse Company, Inc., York, PA (US)

( * ) Notice: Subject to any disclaimer, the term of this patent is extended or adjusted under 35 U.S.C. 154(b) by 683 days.

(21) Appl. No.: 14/569,879

(22) Filed: Dec. 15, 2014

(65) Prior Publication Data
US 2015/0173341 A1 Jun. 25, 2015

Related U.S. Application Data

(60) Provisional application No. 61/919,398, filed on Dec. 20, 2013.

(51) Int. Cl.
*A01M 1/20* (2006.01)

(52) U.S. Cl.
CPC .......... *A01M 1/20* (2013.01); *Y10T 29/49826* (2015.01)

(58) Field of Classification Search
CPC .............................. A01M 1/20; A01M 1/103
See application file for complete search history.

(56) References Cited

U.S. PATENT DOCUMENTS

| 1,430,997 | A | * | 10/1922 | Horn | A47C 31/00 239/57 |
|---|---|---|---|---|---|
| 1,898,738 | A | * | 2/1933 | Meutsch | A47C 31/00 297/180.1 |
| 2,911,756 | A | * | 11/1959 | Geary | A01M 1/02 424/410 |
| 6,998,133 | B2 | * | 2/2006 | Simpson | A01M 1/02 424/403 |
| 8,789,309 | B2 | * | 7/2014 | Fabry | A01M 1/026 43/114 |
| 9,179,783 | B2 | * | 11/2015 | Snell | A47C 31/007 |
| 9,220,254 | B2 | * | 12/2015 | Dong | A01M 1/14 |
| 9,364,096 | B2 | * | 6/2016 | Smithson | A47C 27/122 |
| 2006/0201054 | A1 | * | 9/2006 | Katsuura | A01M 1/20 43/129 |
| 2007/0267912 | A1 | * | 11/2007 | Britton | A47C 7/024 297/452.49 |
| 2008/0305134 | A1 | | 12/2008 | Lucas | |
| 2010/0043274 | A1 | * | 2/2010 | Battick | A01M 1/14 43/114 |
| 2010/0043275 | A1 | * | 2/2010 | Battick | A01M 1/14 43/114 |
| 2011/0289824 | A1 | * | 12/2011 | Wu | A01N 33/24 43/132.1 |
| 2011/0293553 | A1 | * | 12/2011 | Wu | A01N 25/00 424/84 |
| 2011/0311603 | A1 | | 12/2011 | Lucas | |
| 2014/0020280 | A1 | * | 1/2014 | Cullen | A01M 29/34 43/114 |

(Continued)

*Primary Examiner* — Christopher P Ellis
(74) *Attorney, Agent, or Firm* — AuerbachSchrot, LLC; William C. Schrot (57) ABSTRACT

A furniture piece including an insect control barrier comprising a plurality of insecticide strips is provided. The insecticide strips are strategically located on the furniture piece to intersect travel paths from a support surface to prime harborage or feeding locations on the furniture piece.

18 Claims, 13 Drawing Sheets

(56) References Cited

U.S. PATENT DOCUMENTS

| | | | |
|---|---|---|---|
| 2014/0259879 A1* | 9/2014 | Logsdon | A01M 1/2011 43/114 |
| 2015/0007485 A1* | 1/2015 | Hortel | A01M 1/023 43/114 |
| 2015/0007486 A1* | 1/2015 | Backmark | A01M 1/2011 43/114 |
| 2017/0202200 A1* | 7/2017 | Hortel | A01M 1/023 |

* cited by examiner

FURNITURE PIECE WITH INSECT CONTROL BARRIER AND METHOD RELATING THERETO

CROSS REFERENCE TO RELATED APPLICATION AND CLAIM TO PRIORITY

This application is based on U.S. Provisional Application Ser. No. 61/919,398, filed Dec. 20, 2013, which application is incorporated herein by reference in its entirety and to which priority is claimed.

FIELD OF THE INVENTION

The present invention relates to a furniture piece including an insect control barrier, and in particular a furniture piece including barriers containing insecticide for killing bedbugs, and a method of fitting or retrofitting a furniture piece with such barriers.

BACKGROUND OF THE INVENTION

Insect infestations, and in particular bedbug (*Cimex* species) infestations, of human dwellings are on the rise, particularly in North America. For example, the National Pest Management Association reported an explosion in bedbug complaints in the past decade, particular in New York City and other such densely populated areas. The reasons for the resurgence of bedbugs are not entirely clear, but may include the decrease or ban on the use of certain insecticides, increased resistance to certain insecticides, and increased global travel by humans and transport of animals. Indeed, bedbugs and/or their eggs may be readily brought in from an infested area on a person's clothing or luggage, or on infested items (e.g., furniture, animals, etc.).

Generally, bedbugs are nocturnal, parasitic insects which feed exclusively on the blood, with humans being their preferred host. Bedbugs pose a number of health risks, including skin rashes, psychological effects, and allergic symptoms. They are wingless, oval and flat, with full size adults being about 5-7 mm in length. As such, they can readily hide in cracks and crevices during the day, coming out at night to feed. They may be found in and around mattresses, stuffed furniture and cushions, behind picture frames, in dressers and night stands, behind loose wallpaper, in cracks within the walls or floor, and other such shelters. In addition, their tiny eggs readily adhere to surfaces or may be nestled into such crevices. Bedbugs tend to congregate in clusters of adults, juveniles and eggs in such shelters, sometimes referred to as harborages, which are typically close to a known host. Once established in an area, bedbugs quickly multiply.

Bedbugs crawl from their harborages to search for a host, typically feeding every few days. However, they may survive for months without feeding, and obtain all the moisture needed from water vapor in the surrounding air. After feeding or before daylight, bedbugs return to their harborage by following chemical trails. Thus, bedbugs display a particular movement pattern from shelter to host during their life cycle.

The control of bedbugs and treatment of infested areas is very difficult. As such, infestations are of particular concern in densely populated areas, and particularly high density dwellings or facilities such as hotels, child or elder care facilities, student dormitories, military and hospital facilities, etc. In addition to the health and comfort concerns, bedbugs pose an extreme risk to the reputation of any business or facility infested with such pests.

Conventional methods of controlling bedbugs and other insects typically provide for the application of insecticides by spraying or dusting the entire dwelling or house. For example, a building or home may be enclosed or 'tented' and then filled with toxic gas for a period of time sufficient to kill the pests. Although such methods are effective for killing insects, such methods typically require relatively long treatment periods in order to effectively kill the insects, and require the occupants to temporarily move out (or the business to be closed) for several days or more due to the toxicity of the gases used. Moreover, tenting a dwelling is relatively expensive and time consuming given the entire structure must be covered, and can lead to additional damage (e.g., such as roof damage). Furthermore, the toxic gases used for such methods can themselves pose health risks to the occupants, particularly children.

Therefore, there is a need for a method of controlling or killing bedbugs and other pests that overcomes some or all of the problems associated with conventional control methods, and for fitting and/or retrofitting furniture pieces that control or kill bedbugs and other such pests.

SUMMARY OF THE INVENTION

The present invention is directed to a furniture piece including an insect control barrier which kills bedbugs and prevents or substantially reduces the movement of bedbugs between their harborages and areas frequented by their hosts, and methods of locating and fitting such insect control barriers on furniture pieces. In one embodiment, the insect control barrier comprises a plurality of insecticide containing strips strategically positioned thereon so that the bedbugs must cross over the strips as they move from their harborages to an area on the furniture typically occupied by the host. In addition, potential harborage areas on the furniture piece include insecticide strips, thereby killing any bedbugs or other insects attempting to shelter in crevices and spaces within the furniture piece.

According to an embodiment of the present invention, a furniture piece comprises a deck portion, support members and an insect control barrier. The support members have a lower portion configured for engaging a support surface and an upper portion connected to the deck portion. The insect control barrier is secured to the support members, and includes a plurality of flexible insecticide strips substantially surrounding the deck portion and intersecting insect travel paths from the lower portion of the support members to the deck portion. The furniture piece may have various configurations, including for example a bed, a chair, an infant crib, a couch, a wardrobe, or a dresser.

In some implementations, the insecticide strips have a width of between about 1 inch and about 6 inches, for example about 1.5 inch. In some embodiments, the insecticide strips comprise silica. In some embodiments, the insecticide strips comprise diatomaceous earth. In some embodiments, the insect control barrier has a generally rectangular configuration in plan view.

In some implementations, the insect control barrier is a first insect control barrier having a first plurality of insecticide strips disposed on a first plane, wherein the furniture unit also includes a second insect control barrier comprising a second plurality of insecticide strips disposed on a second plane. In some embodiments, the first plane is spaced from and substantially parallel to the second plane. In other embodiments, the second insect control barrier is spaced from and substantially coplanar with the first insect control barrier. In some embodiments, the furniture unit comprises a third insect control barrier comprising a third plurality of insecticide strips spaced from and substantially coplanar with the first and second pluralities of insecticide strips. Each of the first and second insect control barriers may have a generally rectangular configuration in plan view.

In some implementations, the furniture unit comprises a cushion supported by the deck portion. The cushion has an internal member defining an internal area and a covering surrounding the internal area. A second insect control barrier comprising a second plurality of insecticide strips is disposed within the internal area. In some embodiments, the internal member comprises an internal frame. The second insect control barrier may be secured to the internal frame. Alternatively and/or additionally, the second insect control barrier may be sewn into or otherwise secured to internal padding within the internal area, or to an internally disposed surface of the covering.

The present invention also relates to a method of retrofitting a furniture piece with an insect control barrier, comprising the steps of: providing a furniture piece having a deck portion and support members having a lower portion configured for engaging a support surface and an upper portion connected to the deck portion; and securing at least one flexible insecticide strip to the support members and surrounding the deck portion, thereby intersecting insect travel paths from the lower portion of the support members to the deck portion.

In some embodiments, the insecticide strip forms an insect control barrier having a generally rectangular configuration in plan view during the securing step. In some embodiments, the retrofitting method comprises the steps of: securing a first insecticide strip to the support members to form a first insect control barrier; and securing a second insecticide strip to the support members to form a second insect control barrier spaced from the first insect control barrier. In some embodiments, the first insect control barrier is adjacent to and substantially coplanar with the second insect control barrier.

DETAILED DESCRIPTION OF THE INVENTION

The terms "left," "right," "top," "bottom," "front," "rear," "side," "height," "length," "width," "upper," "lower," "interior," "exterior," "inner," "outer" and the like, as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

According to an embodiment of the present invention, a furniture piece with an insect barrier is provided. The insect barrier includes one or more, and preferably a plurality of, strips containing an insecticide. The plurality of insecticide strips are attached to the furniture piece at strategic locations that intersect the likely travel paths of bedbugs as they move out from their harborages, such as for feeding or searching out a human host. Alternatively or in addition, such strategic locations include areas on the furniture which are likely to be bedbug harborages, or proximate to harborages.

The insecticide strips may be attached to either an existing furniture piece, thereby retrofitting such furniture piece with an insect barrier, or alternatively attached to components of a new or disassembled furniture piece. The strips may be secured to the furniture piece at selected locations via staples, tacks, pins, nails, or other fasteners. Alternatively or additionally, the strips may be adhesively secured to the furniture piece at selected locations, and preferably include an adhesive backing for ease of installation. Alternatively, the strips may be sewn into the furniture piece at selected locations (e.g., such as on cushioning or padding material associated therewith). In addition, the strips are preferably flexible, so that they may be easily curved and/or folded around the various components of the furniture piece.

Preferably, the insecticide strips and/or other insecticide treatments (e.g., spray or powder insecticide) utilized in the disclosed invention are generally recognized as safe to humans (as defined by FDA test criteria), and more preferably contain natural, organic and/or food grade ingredients. Insecticide infused fabric suitable for forming the insecticide strips and/or other insecticide spray and powder materials usable for embodiments of the present invention are available from KiltronX Enviro Systems, LLC (Brooklyn, N.Y.).

Having generally described the invention, the same will be further understood through reference to the following examples, which are provided by way of illustration and are not intended to be limiting of the present invention.

EXAMPLES

Armchair with Insect Control Barriers

Referring to FIGS. 1-7 an armchair 10 according to an embodiment of the present invention is illustrated. Armchair 10 includes right and left arm support members 12, 14, a front support member 16 and a rear support member 18. A seat cushion engagement member 20 and a back cushion engagement member 22 are coupled to an inner surface 24 of each of right and left arm support members 12, 14. A seat cushion 26 includes correspondingly configured slots or coupling members 28 that engage seat cushion engagement members 20, so that seat cushion 26 is supported between right and left arm support members 12, 14. Similarly, a back cushion 30 includes correspondingly configured slots or coupling members (not shown) that engage back cushion engagement members 22, so that back cushion 30 is supported between right and left arm support members 12, 14. Thus, a seating area A1 is provided by seat cushion 26 and back cushion 30, and between right and left arm support members 12, 14.

Figure 1:
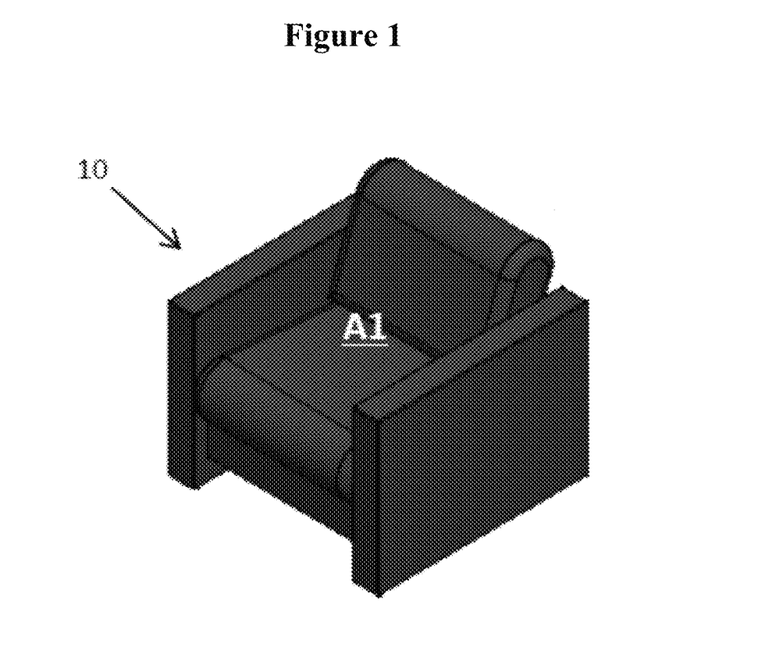
FIG. 1 is a perspective view of an armchair with insect control barriers according to an embodiment of the present invention.
Figure 2:
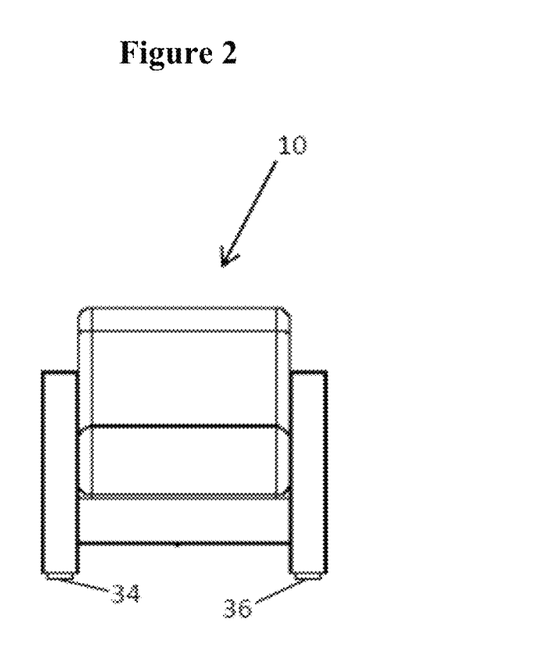
FIG. 2 is a front view of the armchair of FIG. 1.
Figure 3:
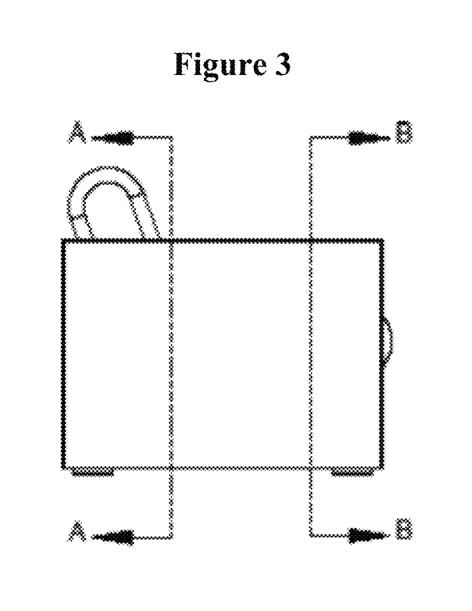
FIG. 3 is a side view of the armchair of FIG. 1.

Right and left arm support members 12, 14 include feet 34, 36, respectively, which extend outwardly for supporting armchair 10 on a floor or other support surface. Preferably, only feet 34, 36 engage the support surface. Thus, bedbugs and other insects would likely access seating area A1 by crawling onto and up feet 34, 36, and then onto or across right and left arm support members 12, 14, front support member 16 and/or rear support member 18.

A plurality of insecticide strips S are attached to components of armchair 10, and strategically located thereon to maximize the possibility of intersecting any travel paths of bedbugs or other insects between the support surface on which armchair 10 rests and seating area A1. In one implementation, strips S are formed of a flexible material having a width of at least about 1 inch, preferably between about 1 inches and about 6 inches, for example about 1.5 inches, and which are adhered onto various components of armchair 10.

Figure 4:
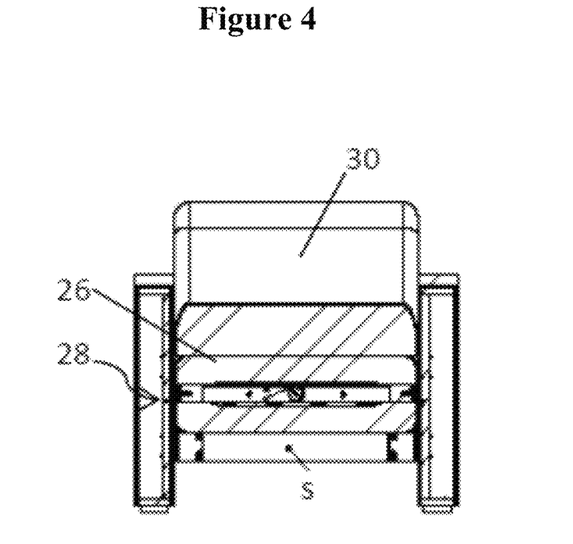
FIG. 4 is a sectional view of the armchair of FIG. 3 taken along line A-A and viewed in the direction of the arrows.
Figure 5:
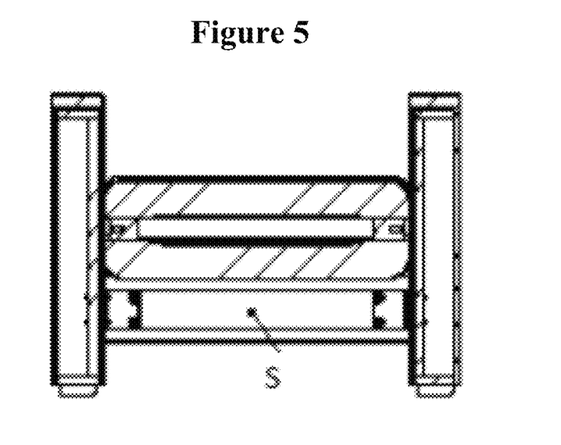
FIG. 5 is a sectional view of the armchair of FIG. 3 taken along line B-B and viewed in the direction of the arrows.
Figure 6:
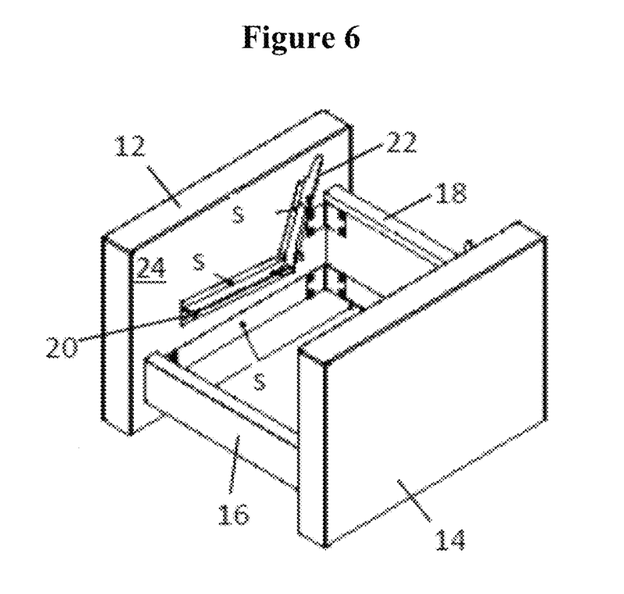
FIG. 6 is a perspective of the armchair of FIG. 1 showing seat and back cushions removed.

As shown in FIGS. 4, 5 and 6, strips S are secured to lower, inner surfaces of right and left arm support members 12, 14 and inner surfaces of front and rear support members 16, 18, and form a generally rectangular or square configuration in plan view. Thus, strips S substantially surround seat cushion 26 in seating area A1. In some embodiments, additional strips S are secured to seat cushion engagement members 20 and back cushion engagement members 22, or alternatively to upper, inner surfaces of right and left arm support members 12, 14 proximate to seat cushion engagement members 20 and back cushion engagement members 22, as shown in FIG. 6.

Figure 7:
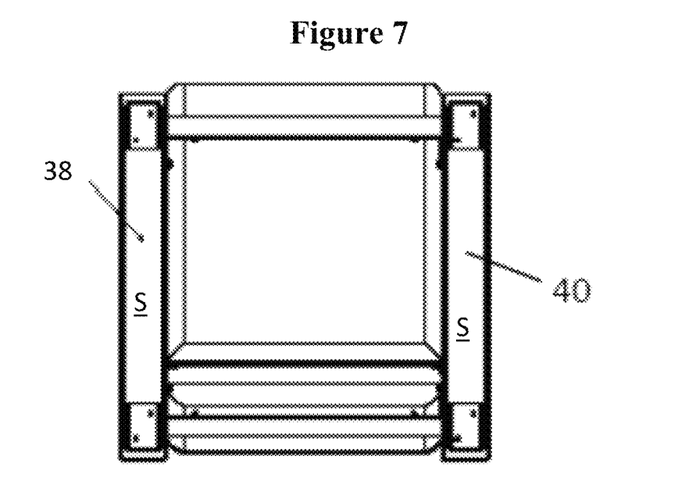
FIG. 7 is a bottom view of the armchair of FIG. 1.

As shown in FIG. 7, additional strips S may also be applied to bottom surfaces 38, 40 of right and left arm support members 12, 14, or alternatively (or additionally) another insecticide composition (e.g., spray or powder insecticide) may be applied to bottom surfaces 38, 40 of right and left arm support members 12, 14. Additional strips S may also be secured to the sides of seat cushion 26 (FIG. 9) and/or back cushion 30 (FIG. 8), and/or another insecticide composition may be applied to cushions 26, 30.

Figure 8:
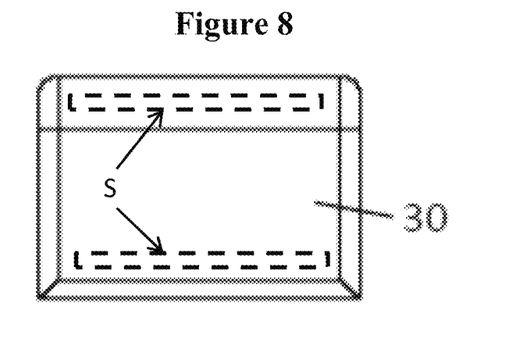
FIG. 8 is a side view of the seat cushion of the armchair of FIG. 1, and showing internal insecticide strips in dashed line.
Figure 9:
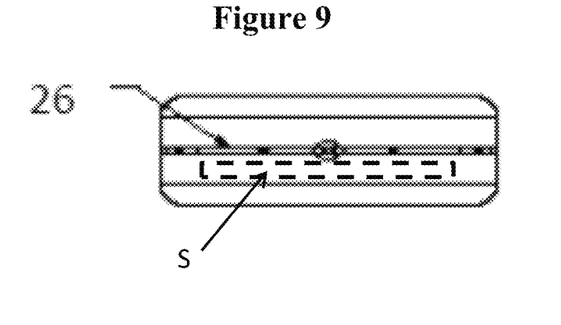
FIG. 9 is a front view of the back cushion of the armchair of FIG. 1, and showing an internal insecticide strip in dashed line.

In some embodiments, one or more strips S are secured to an internal frame inside of seat cushion 26 and/or inside back cushion 30 (as shown in dashed line), and thereafter covered with upholstery and/or padding. Alternatively or additionally, strips S may be sewn into or attached to the upholstery and/or padding on an internal surface thereof (and thus covered by the outer surface of the upholstery so that strips S are not in direct contact with a user when sitting or handling the exterior of the armchair 10.

Thus, virtually all travel paths from the support surface (and harborages of bedbugs) to seating area A1 intersect one or more insecticide strips S, which kill any such bedbugs or other insects attempting to access seating area A1. In addition, potential harborage areas on armchair 10 (e.g., crevices and other spaces between components such as cushions 26, 30 and support members 12, 14, 16, 18) include insecticide strips S, thereby killing any bedbugs or other insects attempting to shelter in such crevices and spaces.

Dresser with Insect Control Barriers

Figure 12:
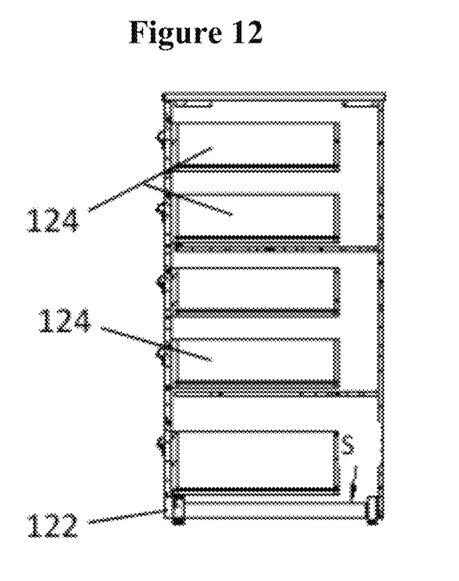
FIG. 12 is a sectional view of the dresser of FIG. 11 taken along line A-A and viewed in the direction of the arrows.
Figure 13:
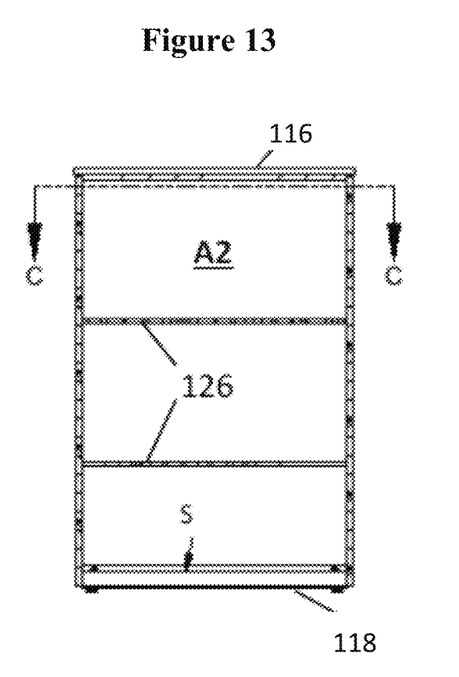
FIG. 13 is a sectional view of the dresser of FIG. 11 taken along line B-B and viewed in the direction of the arrows.

Referring to FIGS. 10-14, a dresser 110 according to an embodiment of the present invention is illustrated. Dresser 110 includes right and left side panels 112, 114, top and bottom panels 116, 118, and a rear panel 120. A lower kickplate or crossbar 122 extends between the lower front portions of right and left side panels 112, 114. A plurality of drawers 124 define a front of dresser 110 (along with crossbar 122), which are slidingly movable into and out of an interior space A2 defined by panels 112, 114, 116, 118, 120, as well known in the art. Support shelves 126 are also provided within interior space A2, as shown in FIG. 13.

Figure 10:
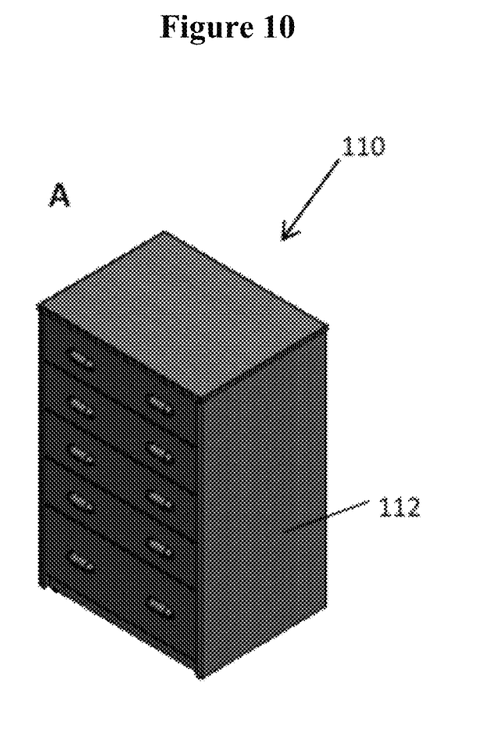
FIG. 10 is a perspective view of a dresser with insect control barriers according to another embodiment of the present invention.
Figure 11:
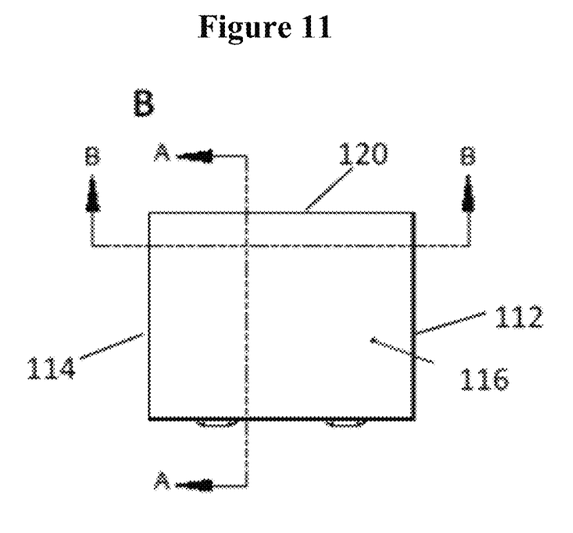
FIG. 11 is a top view of the dresser of FIG. 10.

A plurality of insecticide strips S are attached to components of dresser 110, and strategically located thereon to maximize the possibility of intersecting any travel paths of bedbugs or other insects between a support surface on which dresser 110 rests and interior space A2 and/or the interiors of drawers 124 (and thus any items contained within drawers 124). Strips S may be formed of a flexible material having a width of about 1.5 inches, and are adhered onto various components of dresser 110.

Figure 14:
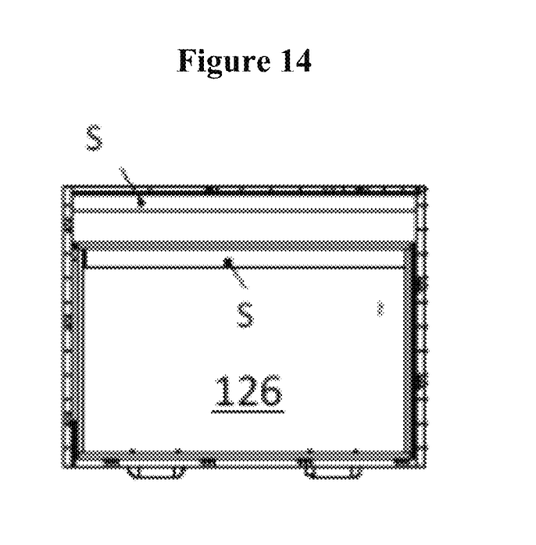
FIG. 14 is a sectional view of the dresser of FIG. 13 taken along line C-C and viewed in the direction of the arrows.

As shown in FIGS. 12 and 13, strips S are secured to the lower, inner surfaces of right and left side panels 112, 114 and rear panel 120, and the inner surface of crossbar 122, and form a generally rectangular or square configuration in plan view. Thus, strips S substantially surround interior space A2. As shown in FIG. 14, additional strips S are secured to surfaces of support shelves 126 proximate to rear panel 120.

Thus, travel paths from the support surface (and harborages of bedbugs) to interior space A2 intersect one or more insecticide strips S, which kill any such bedbugs or other insects attempting to access interior space A2 and/or drawers 124. In addition, potential harborage areas in dresser 110 (e.g., crevices and other spaces behind drawers 124 and/or on or around support shelves 126) include insecticide strips S, thereby killing any bedbugs or other insects attempting to shelter in such crevices and spaces.

Bed with Insect Control Barriers

Referring to FIGS. 15-18, a bed 210 according to an embodiment of the present invention is illustrated. Bed 210 includes right and left side panels 212, 214, end panels 216, 218, and a support deck 220. Panels 212, 214, 216, 218, 220 form a generally box-like structure defining an interior space(s) A3. First and second spaced, center stiles 222, 224 are provided within interior space(s) A3, extending between right and left side panels 212, 214 and beneath support deck 220.

Figure 15:
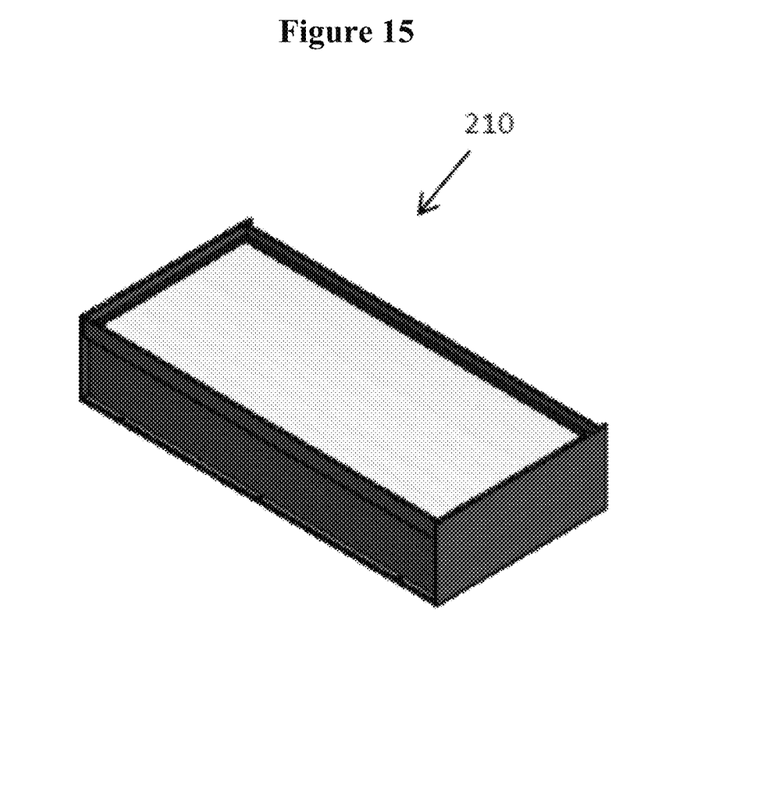
FIG. 15 is a perspective view of a bed with insect control barriers according to another embodiment of the present invention.

A plurality of insecticide strips S are attached to components of bed 210, and strategically located thereon to maximize the possibility of intersecting any travel paths of bedbugs or other insects between a support surface on which bed 210 rests and interior space A3 and/or support deck 220 (on which a mattress and/or bedding material is disposed). Preferably, strips S are not attached to the exteriorly disposed surface of support deck 220 which is in direct contact with the bedding material and/or user. Strips S may be formed of a flexible material preferably having a width of at least about 1 inch, preferably between about 1 inches and about 6 inches, for example about 1.5 inches, and are adhered onto various components of bed 210.

Figure 16:
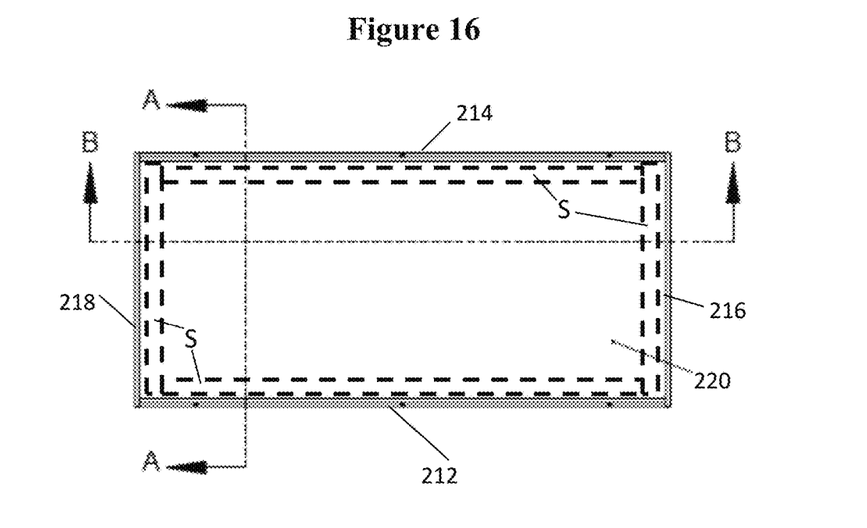
FIG. 16 is a top view of the bed of FIG. 15.
Figure 17:
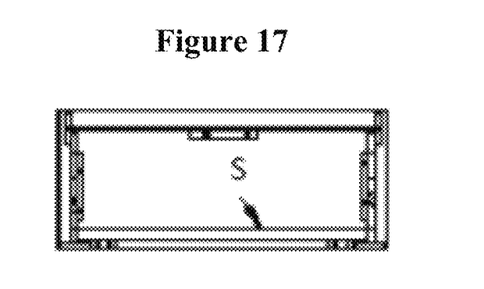
FIG. 17 is a sectional view of the bed of FIG. 16 taken along line A-A and viewed in the direction of the arrows.
Figure 18:
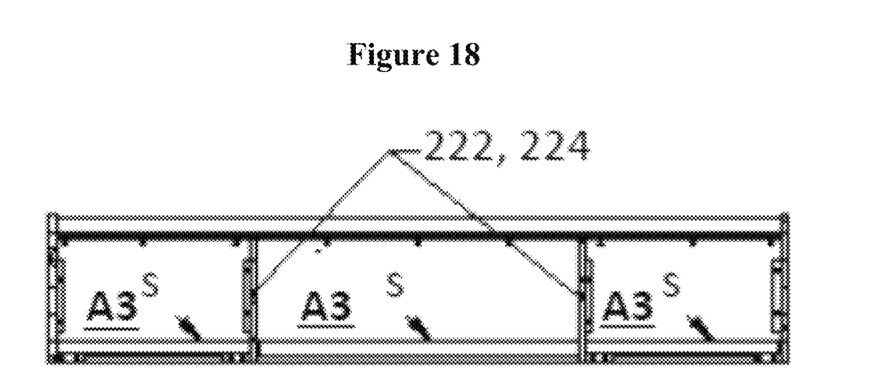
FIG. 18 is a sectional view of the bed of FIG. 16 taken along line B-B and viewed in the direction of the arrows.

As shown in FIGS. 17 and 18, strips S are secured to the lower, interiorly disposed surfaces of right and left side panels 212, 214 and end panels 216, 218. On each of right and left side panels 212, 214, three sections of strips S are provided given center stiles 222, 224 intersect right and left side panels 212. Additional strips S are secured to the lower, inner surface of opposing sides of each of center stiles 222, 224. Thus, strips S proximate to the lower inner surfaces form three generally rectangular or square configurations in plan view, which are preferably coplanar in plan view and relative to each other, and which substantially surround interior space(s) A3. In some embodiments, as shown in FIG. 16 additional strips S (shown in dashed line) may be secured around the interiorly disposed, perimeter areas of support deck 220.

Travel paths from the support surface (and harborages of bedbugs) to interior space A3 intersect one or more insecticide strips S, which kill any such bedbugs or other insects attempting to access interior space A3 and/or support deck 220. In addition, potential harborage areas in bed 210 (e.g., crevices and other spaces underneath support deck 220 and thus proximate to bedding materials thereon) include insecticide strips S, thereby killing any bedbugs or other insects attempting to shelter therein.

Armchair (2) with Insect Control Barriers

Figure 19:
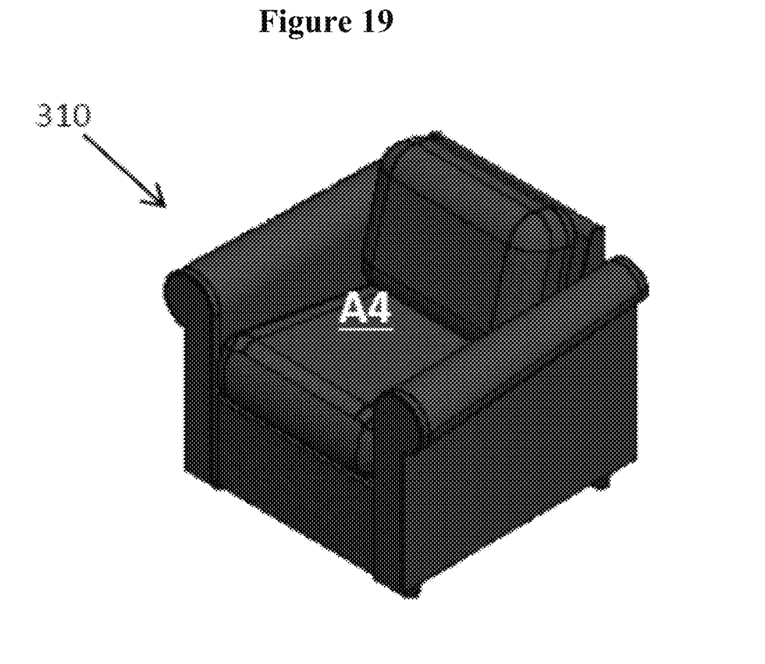
FIG. 19 is a perspective view of an armchair with insect control barriers according to another embodiment.
Figure 20:
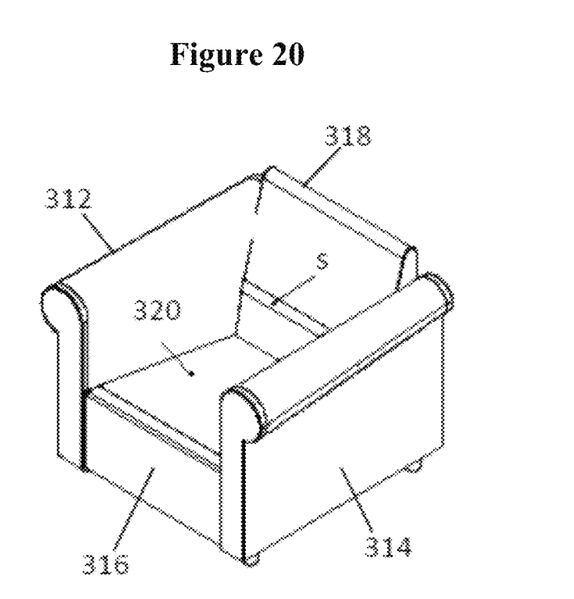
FIG. 20 is another perspective view of the armchair of FIG. 19.
Figure 21:
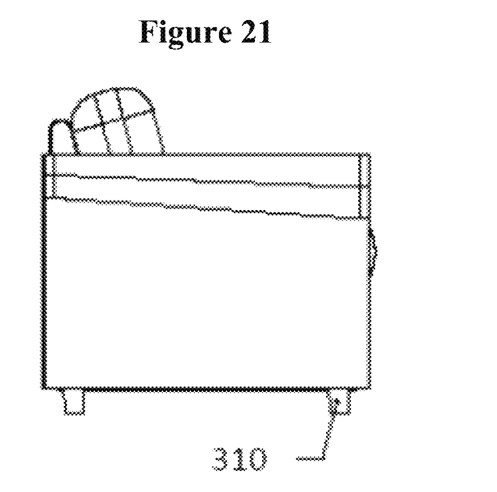
FIG. 21 is a side view of the armchair of FIG. 19.
Figure 22:
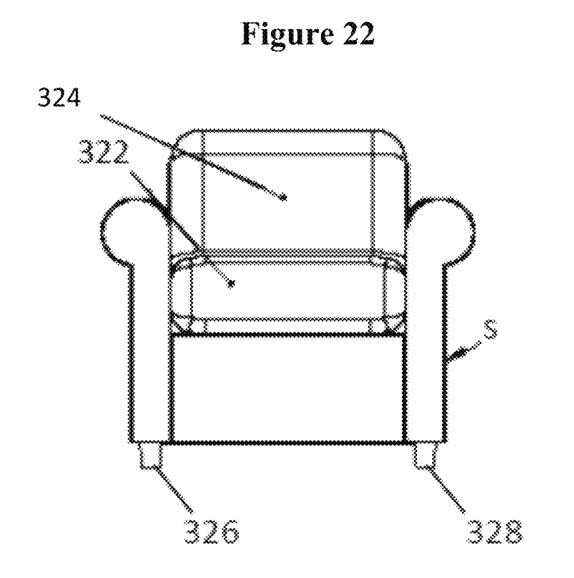
FIG. 22 is a front view of the armchair of FIG. 19.

Referring to FIGS. 19-23, an armchair 310 according to another embodiment of the present invention is illustrated. Armchair 310 includes right and left arm members 312, 314, front and rear members 316, 318, and a cushion liner 320, which collectively define a seating area A4. A seat cushion 322 and a back cushion 324 are received in seating area A4, as shown in FIGS. 19 and 22. Right and left arm members 312, 314 include feet 326, 328, respectively, which extend outwardly for supporting armchair 310 on a floor or other support surface. Preferably, only feet 326, 328 engage the support surface. Thus, bedbugs and other insects would likely access seating area A4 by crawling onto and up feet 326, 328, and then onto or across right and left arm members 312, 314, front member 316 and/or rear member 318.

A plurality of insecticide strips S are attached to components of armchair 310, and strategically located thereon to maximize the possibility of intersecting any travel paths of bedbugs or other insects between the support surface on which armchair 310 rests and seating area A4. In one implementation, strips S are formed of a flexible material preferably having a width of at least about 1 inch, preferably between about 1 inches and about 6 inches, for example about 1.5 inches, and which are adhered onto various components of armchair 310.

Figure 23:
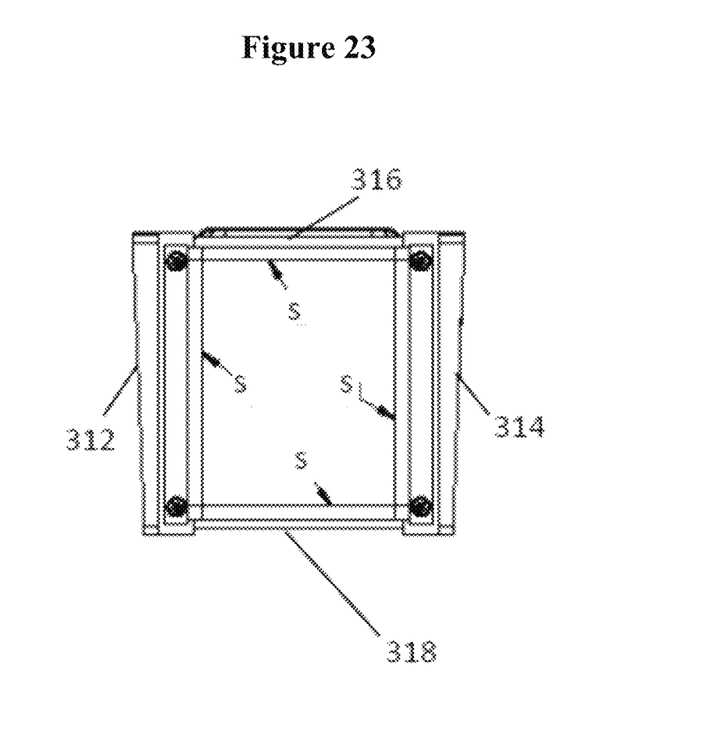
FIG. 23 is a bottom view of the armchair of FIG. 19.

As shown in FIG. 23, strips S are secured to an undersurface of right and left arm members 312, 314, front member 316 and/or rear member 318, and extend between feet 326, 328 to form a generally rectangular or square configuration in plan view. Thus, strips S substantially surround seating area A4. An additional strip S is secured to an inner surface of rear member 318. The upwardly disposed surface of cushion liner 320 and/or cushions 322, 324 are preferably treated with an insecticide spray or powder.

Thus, travel paths from the support surface (and harborages of bedbugs) to seating area A4 intersect one or more insecticide strips S, which kill any such bedbugs or other insects attempting to access seating area A4. In addition, insecticide treated cushions 322, 324 and/or cushion liner 320 kills any bedbugs or other insects attempting to shelter under or in cushions 322, 324.

Side Chair with Insect Control Barriers

Referring to FIGS. 24-28, a side chair 410 according to another embodiment of the present invention is illustrated. Side chair 410 includes right and left support members 412, 414, a lower cross bar 416, and seat support members 418, 420, 422, 424. A seat cushion member 426 is supported by seat support members 418, 420, 422, 424, and a back support 428 is coupled to and extends between upper portions 430, 432 of right and left support members 412, 414, respectively. Seat cushion member 426 and back support 428 collectively define a seating area A5.

Figure 24:
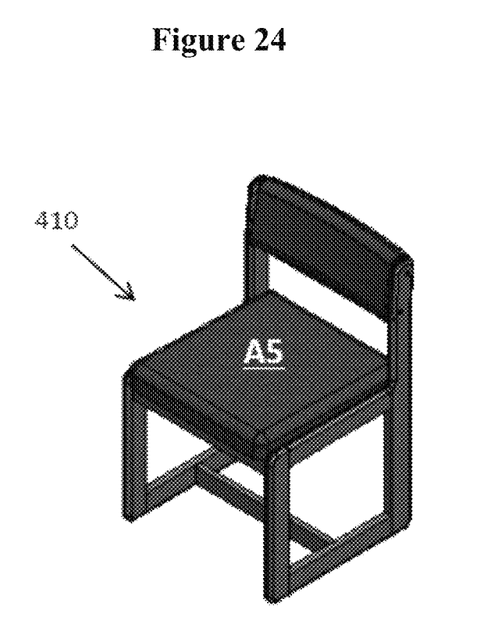
FIG. 24 is a perspective view of a side chair with insect control barriers according to another embodiment of the present invention.
Figure 25:
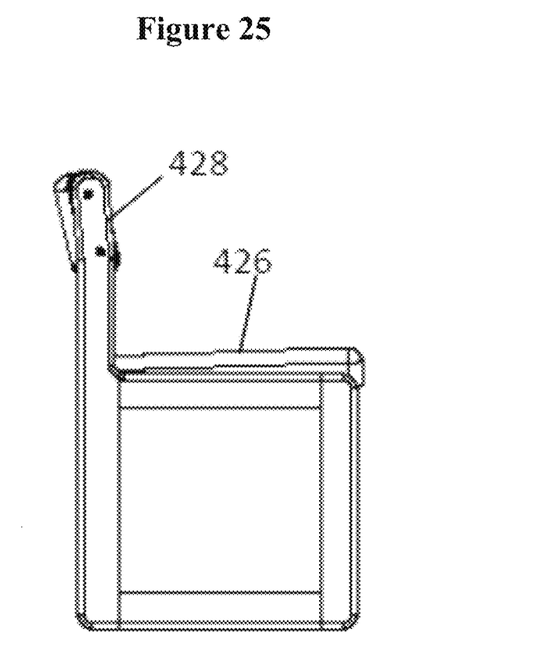
FIG. 25 is a side view of the side chair of FIG. 24.

A plurality of insecticide strips S are attached to components of side chair 410, and strategically located thereon to maximize the possibility of intersecting any travel paths of bedbugs or other insects between the support surface on which side chair 410 rests and seating area A5. In one implementation, strips S are formed of a flexible material preferably having a width of at least about 1 inch, preferably between about 1 inches and about 6 inches, for example about 1.5 inches, and which are adhered onto various components of side chair 410.

Figure 26:
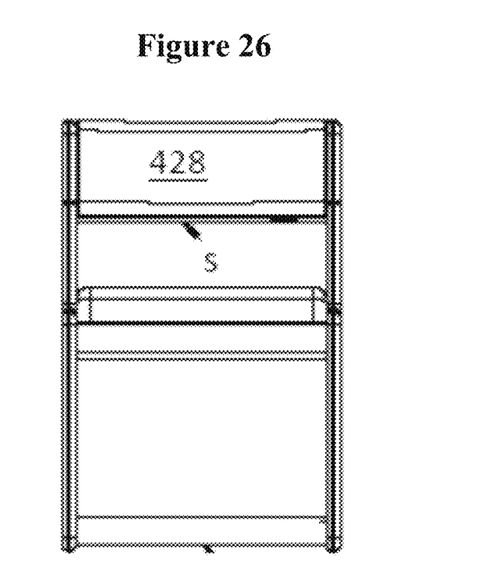
FIG. 26 is a front view of the side chair of FIG. 24.
Figure 27:
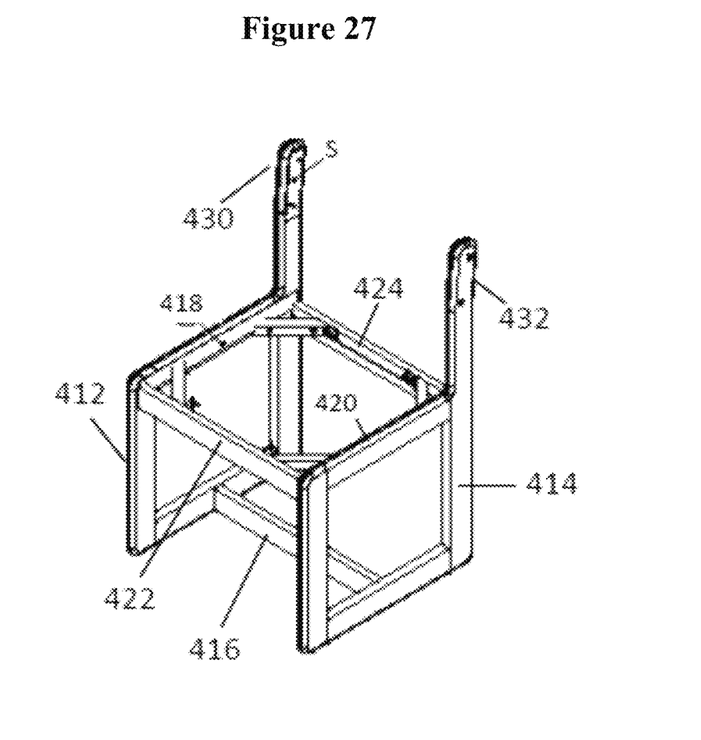
FIG. 27 is a perspective view of the side chair of FIG. 24 with seat and back cushions removed.
Figure 28:
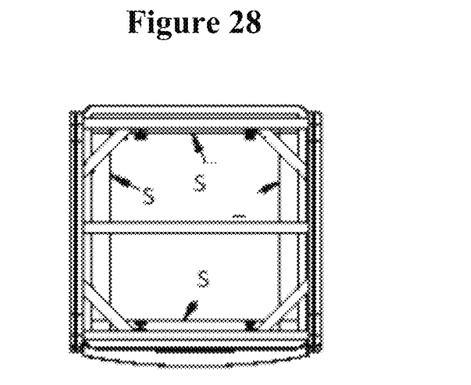
FIG. 28 is a bottom view of the side chair of FIG. 24.

As shown in FIG. 28, strips S are secured to an upper surface of seat support members 418, 420, 422, 424, forming a generally rectangular or square configuration in plan view. Thus, strips S substantially surround seating area A5. As shown in FIG. 26, an additional strip S is secured to a back side of back support 428. In one implementation, the additional strip S is secured to the staple groove of the component forming back support 428 prior to being covered with such cushioning material.

Travel paths from the support surface (and harborages of bedbugs) to seating area A5 intersect one or more insecticide strips S, which kill any such bedbugs or other insects attempting to access seating area A5, and/or kills any bedbugs or other insects attempting to shelter under or in cushion member 426 and/or back support 428.

While the present invention has been described in connection with a particular embodiment thereof, it will be understood that it is capable of further modifications and this application is intended to cover any such variations, uses, or adaptations of the invention following, in general, the principles of the invention and including such departures from the present disclosure as come within known or customary practice within the art to which the invention pertains and as may be applied to the features hereinbefore set forth.

What is claimed is:

1. A furniture piece, comprising:
a deck portion;
support members having a lower portion configured for engaging a support surface and an upper portion connected to said deck portion so that said deck portion is spaced from said support surface; and
an insect control barrier secured to said support members, said insect control barrier comprising a first plurality of insecticide strips disposed on a first plane and a second plurality of insecticide strips disposed on a second plane spaced from said first plane, said first and second pluralities of flexible insecticide strips substantially surrounding said deck portion and intersecting substantially all insect travel paths from said lower portion of said support members to said deck portion.

2. The furniture piece of claim 1, wherein said insecticide strips comprise silica.

3. The furniture piece of claim 1, wherein said insecticide strips comprise diatomaceous earth.

4. The furniture piece of claim 1, wherein said insect control barrier has a generally rectangular configuration in plan view.

5. The furniture piece of claim 1, wherein said furniture piece is selected from the group consisting of a bed, a chair, an infant crib, a couch, a wardrobe, and a dresser.

6. The furniture piece of claim 1, wherein each of said insecticide strips has a width of between about 1 inch and about 6 inches.

7. The furniture piece of claim 1, wherein said first plane is substantially parallel to said second plane.

8. The furniture piece of claim 1, wherein said first plane is substantially perpendicular to said second plane.

9. The furniture piece of claim 8, further comprising a third plurality of insecticide strips spaced from and substantially coplanar with at least one of said first or second pluralities of insecticide strips.

10. The furniture piece of claim 1, wherein each of said first and second pluralities of insecticide strips has a generally rectangular configuration in plan view.

11. The furniture piece of claim 1, wherein said support members have a generally rectangular configuration in plan view, said support members surrounding said insect control barrier.

12. The furniture piece of claim 11, wherein the furniture piece is a bed or a couch.

13. The furniture piece of claim 1, further comprising:
a cushion supported by said deck portion, said cushion have an internal member defining an internal area and a covering surrounding said internal area; and
a second insect control barrier comprising a third plurality of insecticide strips disposed within said internal area.

14. The furniture piece of claim 13, wherein said internal member comprises an internal frame, said second insect control barrier secured to said internal frame.

15. A method of retrofitting a furniture piece with an insect control barrier, comprising the steps of:
providing a furniture piece having a deck portion and support members having a lower portion configured for engaging a support surface and an upper portion connected to said deck portion; and
securing an insect control barrier to said support members, said insect control barrier comprising a first plurality of insecticide strips disposed on a first plane and a second plurality of insecticide strips disposed on a second plane spaced from said first plane, so that said first and second pluralities of flexible insecticide strips substantially surround said deck portion and intersect substantially all insect travel paths from said lower portion of said support members to said deck portion.

16. The method of claim 15, wherein said secured insect control barrier has a generally rectangular configuration in plan view.

17. The method of claim 15, wherein said furniture piece is selected from the group consisting of a bed, a chair, an infant crib, a couch, a wardrobe, and a dresser.

18. The method of claim 15, wherein said insecticide strips comprise diatomaceous earth or silica.

* * * * *